Patented May 19, 1931

1,805,517

UNITED STATES PATENT OFFICE

WILLIAM FELDENHEIMER, OF LONDON, ENGLAND

MANUFACTURE OF RUBBER COMPOSITIONS

No Drawing. Application filed March 14, 1924, Serial No. 699,346, and in Great Britain March 27, 1923.

The present invention is for improvements in and relating to the manufacture of rubber composition containing clay.

The proposal to use ordinary china clay as a component of vulcanized rubber compositions has been known for some time. Subsequently, it was discovered that if the clay employed for this purpose was purified by peptization, improved qualities were conferred upon the rubber compositions with which the clay was incorporated. I have now found that if clay be brought into suspension in water by aid of a peptizing agent and thereafter separated by flocculation, there is a marked diminution in the advantageous properties of the rubber compositions with which such clay is incorporated when the latter has been flocculated by addition to its suspension of a strong acid or a sulphate, such as alum, or aluminum sulphate, which is commonly employed as a flocculator for clay after peptization or as it is sometimes termed deflocculation.

When an excess of a strong inorganic acid or its salt, for example, hydrochloric acid, sulphuric acid, alum or aluminum sulphate has been used to bring about the flocculation of the clay, the addition of the latter to rubber mixes, which are vulcanized to produce soft rubber goods, not only retards the speed of vulcanization but effects deleteriously the properties of high breaking strain and tensile strength of the product but also, in some cases, affects the ageing properties. With some clays the concentration of alkaline deflocculator required to effect de-flocculation is high, in which case the quantity of flocculator necessary for effecting flocculation is correspondingly high, and in some instances two or three times the amount of flocculator may be necessary in comparison with the amount of deflocculator previously required for the preceding deflocculation. In such a case, should the flocculator be, for example, alum of aluminum sulphate, the whole of the advantages derivable from deflocculation may be lost, and the results yielded by the rubber mix may actually be substantially worse than those given by the same clay without any deflocculation treatment. In all cases whether the quantity of deflocculator required to deflocculate the clay be high or low, it is desirable to employ as little flocculator as possible to effect flocculation: should the flocculator be an acid or the salt of a strong acid.

For convenience, the condition of the flocculated product which is brought about by the employment of this type of flocculating agent and which is responsible for reducing the advantageous properties of the rubber compositions will be referred to herein as "acidity", although it will be appreciated by those acquainted with the art that the term as employed in this special connection has not the popular significance usually attached to it. And, in the present invention, I aim to produce a final flocculated clay of "low acidity" as defined herein.

According to the present invention, the manufacture of rubber compositions containing clay is characterized by the selection for addition to the rubber mixing of a flocculated clay of low acidity, that is to say, of a clay which has been brought into suspension in water through the action of a peptizing agent and, after removal of unpeptized material as may be required, has been separated from the suspension by flocculation by addition of a flocculating reagent, the flocculated product to be added to the mix having by itself an acidity below that possessed by clay flocculated from its suspension in the ordinary manner by a strong acid, by which is meant a strong acid itself or a salt thereof, such, for example, as sulphuric acid, or aluminum sulphate.

The flocculated clay of low acidity may be obtained by flocculating the clay from its suspension in known manner by addition of a strong acid as defined, and then washing the flocculated product with water, or with a solution of an alkali in quantity sufficient to balance or partially to balance the acid.

Alternatively, the clay may be prepared by effecting the flocculation with an alkaline base (such, for example, as lime), or a salt thereof with a weak acid (such as the bicarbonate of an alkali metal, as is described in the specification of British Letters Patent No. 106,890), or with an organic acid (such as acetic acid).

A flocculated product of the required low acidity may also be obtained by effecting the flocculation with a strong acid (for example, sulphuric acid or a sulphate such as alum or aluminum sulphate) in presence of a colloid, for example, rosin combined with said alkali, which reduces the concentration of the flocculator necessary for effecting flocculation.

I have found that advantageous results are obtained by bringing the clay into suspension in water by admixture with a dilute aqueous solution of and alkali pyrophosphate (for instance, normal sodium pyrophosphate) according to United States Patent No. 1,438,588, and flocculating the clay according to any of the above-mentioned methods.

When the clay to be treated is of the class resistant to peptization by a normal alkali metal carbonate, such a carbonate may be employed for effecting the flocculation of the clay.

Certain clays are known which, instead of being deflocculated by the usual deflocculators, for example, normal sodium carbonate, or caustic soda, are flocculated by these reagents at certain concentrations. This behaviour of such clays may be turned to account for the purposes of the present invention by utilizing these alkaline reagents for effecting the flocculation, because whether the flocculator is alkaline, or not acid, the deleterious effect upon the physical properties of the rubber mixing is generally less marked.

Clay of low acidity as hereinbefore defined therefore comprises flocculated clay which is neutral or slightly alkaline.

Another means of obtaining the flocculated clay of low acidity is to reduce the degree of acidity after flocculation of the clay from its suspension. For example, it may be ascertained that a given quantity of an alkaline deflocculator is required in order to balance the acidity of the flocculated product, and this quantity of alkaline deflocculator may then be added after the flocculation, and the product thus balanced can then be used in a rubber mix with the advantages already referred to.

Like improved results have been obtained when the clay has been flocculated with sodium carbonate or calcium hydrate, or calcium hydrate together with aluminum sulphate or in some cases when a colloid flocculator such as gelatine (e. g. glue) has been employed.

Different clays require different treatment in order to obtain the best results. For example, a Georgia clay from the Gordon district of Georgia was deflocculated by sodium pyrophosphate and required, relatively to the quantity of pyrophosphate, about three times the quantity of aluminum sulphate to effect flocculation. This clay when dried and put into a rubber mix gave on vulcanization a result inferior to that given by the same clay which had been deflocculated by a mixture of sodium pyrophosphate and sesqui-carbonate of soda and then flocculated by one part of aluminum sulphate relatively to the total deflocculator in order to effect flocculation, and this clay gave the best results of all, with improved toughening properties and resistance to wear of the rubber composition, so desirable in rubber tyre manufacture.

It was found that clay from Lanvrian, Morbihan, France, required over twice the concentration of aluminum sulphate relatively to the quantity of deflocculator in order to effect flocculation after deflocculation by sodium pyrophosphate, whereas when barium hydrate was employed as deflocculator only half the quantity of aluminum sulphate relatively to the quantity of barium hydrate, was necessary for flocculation.

An English clay from the Dartmoor district, after having been flocculated by aluminum sulphate and dried, was re-treated by rewashing and balancing the acidity by an alkaline deflocculator, namely, sodium pyrophosphate, so as to bring the finished clay to the alkaline side of the neutral point. Balancing was also effected by the addition of lime, the clay being the same as before, and in both these cases the results were superior to those given by clay which had been flocculated in the usual known manner.

The general effect of addition to vulcanizable rubber mixings of clay of low acidity as hereinbefore defined is to give not only an increased speed of cure, but what is much more important, a valuable increase in the breaking strain, and improved aging and wearing properties of the vulcanized product, and these properties are usually found to be markedly superior to those possessed by rubber compositions compounded with clay having the higher degree of acidity consequent upon flocculation from its suspension in the ordinary manner with powerful acids or their salts.

The following is an example of the effect attained by operating according to this invention:

(a) 8 lbs. of Florida clay from Leesburg were peptized (deflocculated) in six gallons of soft water by the addition of ½ oz. of sodium pyrophosphate and ¾ grams of rosin. The rosin is acted upon by the sodium pyrophosphate (this being somewhat alkaline in its nature), in the manner well known to chemists, to form a rosin soap (namely a colloid), which mixes with the water present, as a colloidal solution. The resulting suspension was left to stand for the settlement of the impurities and the clay was then flocculated by the addition of ¼ oz. of aluminum sulphate. The aluminum sulphate, reacts with the phosphate and rosin soap, forming precipitates, these precipitates being in small amount only, relative to the amount of the clay.

(b) The same clay was treated with pyrophosphate in the absence of rosin, and flocculated as before with aluminum sulphate. It was found that at least six times as much of the flocculator was required in order to effect the flocculation.

The choice of a suitable deflocculator for a particular clay is very important, for, as shown above, by changing the deflocculator or by using a mixture of deflocculating reagents, it is possible to reduce the quantity of the flocculator subsequently employed, and thus obtain a flocculated product of improved quality in respect to acidity.

It will be appreciated that the choice of the flocculating reagent in any particular case must be determined by circumstances, such as the nature of the clay, for different clays will not necessarily behave in the same manner towards a given deflocculating or flocculating reagent, as is indeed indicated by the fact already mentioned that reagents which are deflocculators for certain clays, such, for instance, as normal sodium carbonate and caustic soda, can be employed in the case of other clays as flocculating agents. It does not follow therefore because a given flocculator can be successfully used to precipitate a given clay suspension, that the same reagent is applicable to a different clay, and when the properties of the latter are unknown a preliminary experiment must be performed to fix the most appropriate conditions of treatment.

By selecting a deflocculator for a given clay and a flocculator capable of reacting with the deflocculator to give a water-insoluble product, a rubber filler may be simultaneously produced with the clay of low acidity. For example, barium hydroxide may be employed as the deflocculating reagent, and sulphuric acid or aluminum sulphate as the flocculator, whereby barium sulphate will be formed, a compound insoluble in water and already frequently employed in rubber compositions as a filler.

What I claim as my invention and desire to secure by Letters Patent is:

1. The process of manufacture of rubber compositions containing clay, comprising the steps of suspending clay in water by addition of an alkali pyrophosphate in the presence of rosin, removing any undeflocculated matter, flocculating the clay from its suspension by the aid of a strong acid, and incorporating the so obtained flocculated product of low acidity with the rubber mixing.

2. The process of manufacture of rubber compositions containing clay, comprising the steps of suspending clay in water by addition of sodium pyrophosphate in the presence of rosin, removing any undeflocculated matter, flocculating the clay from its suspension by the aid of a strong acid, and incorporating the so obtained flocculated product of low acidity with the rubber mixing.

3. The process of manufacture of rubber compositions containing clay, comprising the steps of suspending clay in water by means of an inorganic deflocculating agent and a colloid material which is soluble in alkalies, removing any undeflocculated matter, flocculating the clay from its suspension by adding an acid material, the acid material computed as aluminum sulphate, being equal to not over half of the quantity of the deflocculating agent computed as sodium pyrophosphate, and incorporating the so obtained flocculated product of low acidity with the rubber mixing.

In testimony whereof I affix my signature.

WILLIAM FELDENHEIMER.